United States Patent [19]

Ziegler

[11] Patent Number: 5,441,146
[45] Date of Patent: Aug. 15, 1995

[54] PACKAGING MACHINE
[75] Inventor: Otto Ziegler, Rot am See, Germany
[73] Assignee: Robert Bosch GmbH, Stuttgart, Germany
[21] Appl. No.: 238,088
[22] Filed: May 4, 1994
[30] Foreign Application Priority Data May 4, 1993 [DE] Germany .................. 43 14 613.9

[51] Int. Cl.⁶ .............................................. B65G 29/00
[52] U.S. Cl. ............................... 198/803.01; 198/347.2
[58] Field of Search ............. 198/347.2, 465.1, 803.01, 198/803.3, 803.8, 803.11, 803.14

[56] References Cited

U.S. PATENT DOCUMENTS

| 3,122,229 | 2/1964 | Engleson et al. | 198/347.2 |
| 3,545,933 | 12/1970 | Podschadly | 198/465.1 X |
| 3,622,043 | 11/1971 | Chotard | 198/465.1 X |
| 3,675,759 | 7/1972 | Koppe | 198/803.01 |
| 3,972,407 | 8/1976 | Kushigian | 198/347.2 X |
| 4,657,467 | 4/1987 | Ransohoff et al. | 198/803.14 X |
| 4,717,010 | 1/1988 | Deal et al. | 198/347.2 |
| 5,373,934 | 12/1994 | Jackson et al. | 198/803.8 |

Primary Examiner—James R. Bidwell
Attorney, Agent, or Firm—Edwin E. Greigg; Ronald E. Greigg

[57] ABSTRACT

A packaging machine for filling and sealing containers including a conveyor device with drivers with which container receptacles can be coupled. A changing device that conveys the container receptacles from the drivers to magazine rails and vice versa is located at a station of the conveyor device. The magazine rails are interchangeably secured to a magazine carrier. The changing device has a reciprocating drive with a bar and tappets for transferring container receptacles from the drivers into the magazine rails, and a holding-down device, which is moved via a tie rod, for transferring container receptacles from the magazine rails to the drivers.

20 Claims, 3 Drawing Sheets

Fig. 2
Fig. 3
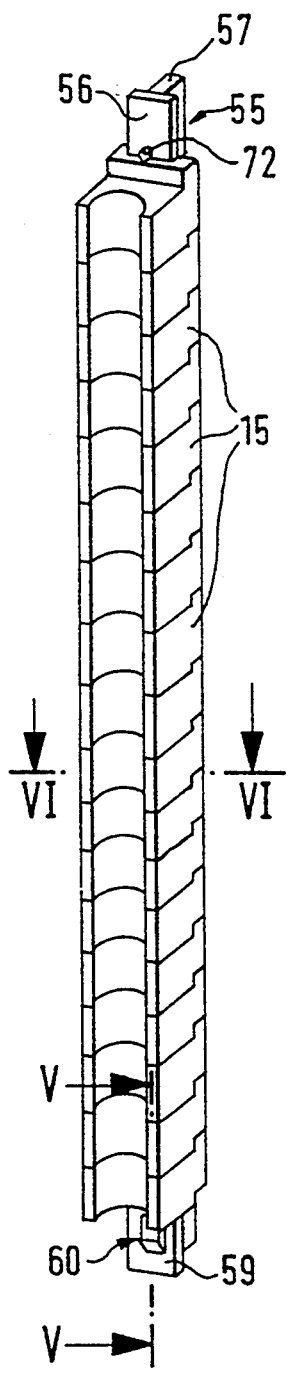
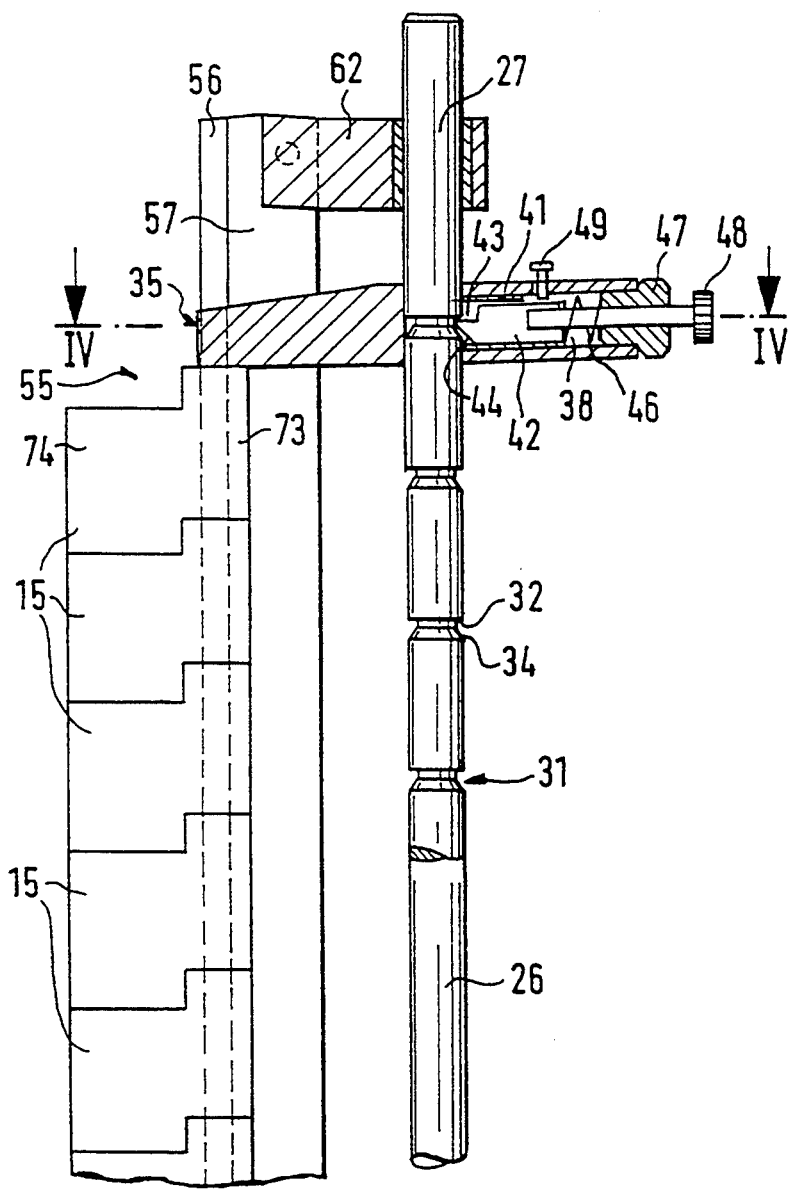

PACKAGING MACHINE

BACKGROUND OF THE INVENTION

The invention is based on a packaging machine as defined hereinafter. When containers such as bottles, vials and ampules are filled and sealed, they are delivered individually or in groups, in container receptacles, to a conveying device of the machining stations of a packaging machine. If different types and formats of containers are to be manipulatable in the packaging machine, then the container receptacles adapted to the particular containers have to be exchanged for one another. It is known, for instance, to store the container receptacles in magazines in format changing stations disposed at the ends of a packaging machine. The format changing stations have receptacles for the container receptacles, which are secured to a chain conveyor. The leading and trailing sides of the chain conveyor are arranged such that two receptacles are simultaneously located in the conveying plane of the packaging machine. Thus by means of a further conveyor device associated with the format changing station, a container receptacle can be removed from the conveyor device and at the same time exchanged for a different container receptacle from the format changing station. The format changing station of the known packaging machine is vulnerable to malfunction and expensive, however, because of the chain drive and the attendant effort and expense for driving and controlling it. Moreover, the holding capacity of the format changing station is limited by the number of receptacles, which makes for low flexibility of the packaging machine.

OBJECT AND SUMMARY OF THE INVENTION

The packaging machine according to the invention has the advantage over the prior art that the magazine rails along with the individual container receptacles can be exchanged within a short time, thus minimizing the conversion time during which the machine is stopped. It is also simple to increase the capacity of a magazine rail, by lengthening the rails that carry the container receptacles. If one magazine rail is insufficient to store the container receptacles that are in circulation in the packaging machine, then a plurality of magazine rails are simply used for storing them. The magazine rail is also especially compact because the container receptacles are stacked directly one above the other. In addition, the packaging machine according to the invention is not vulnerable to malfunction, since replacing the container receptacles is carried out by a single changing device. The capacity of the packaging machine of the invention can be increased if a plurality of magazine rails that are actuated by the same changing device are disposed side by side. Also, two changing devices, for instance, can be disposed side by side on the conveyor device; the first one removes the container receptacles located on the conveyor device, and the second one supplies the conveyor device with new container receptacles.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a perspective view of a magazine rail with container receptacles.

FIG. 3 shows the upper portion of the magazine rail of FIG. 2 in longitudinal section;

DESCRIPTION OF THE PREFERRED EMBODIMENT

Figure 1:
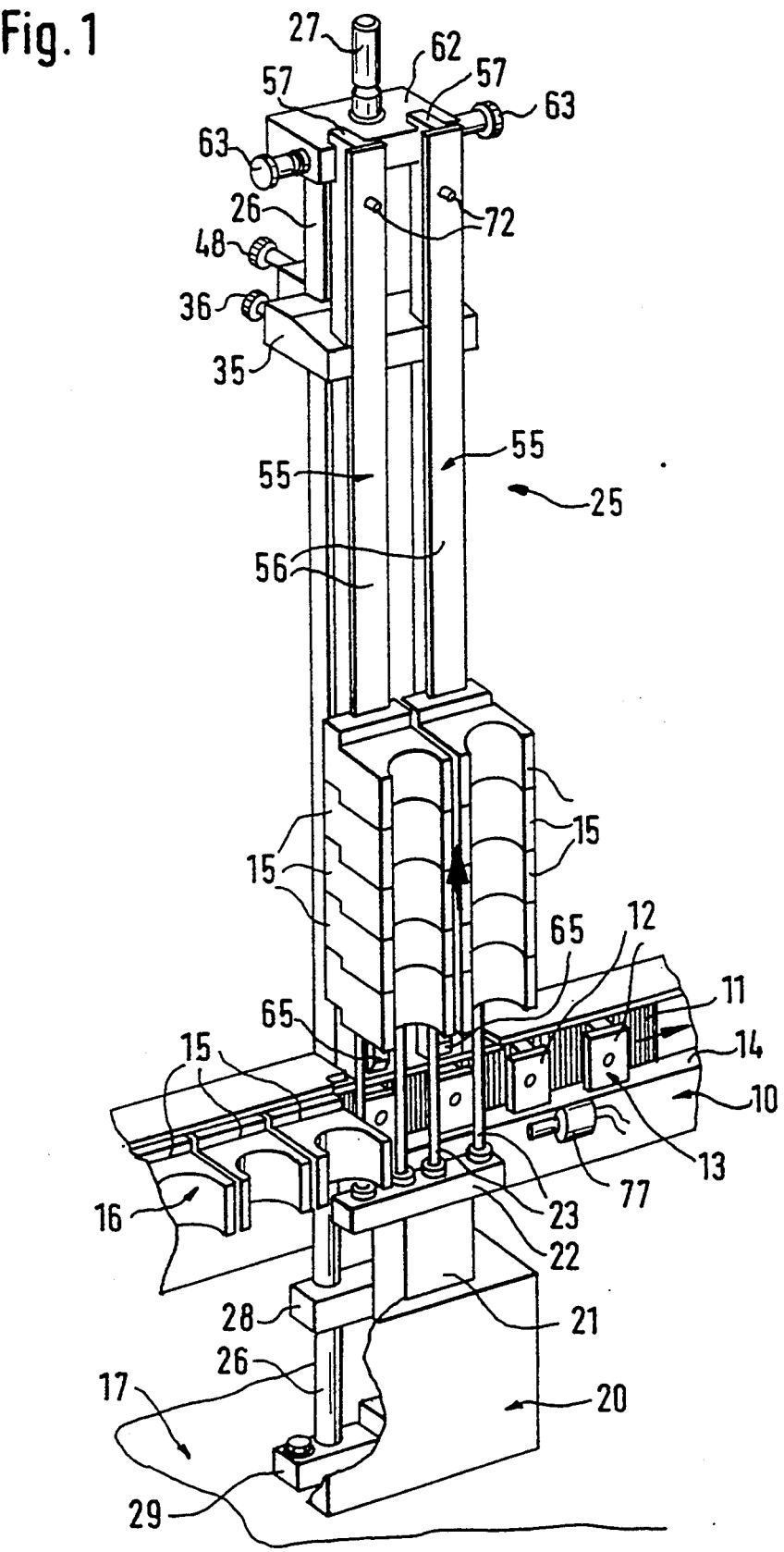
FIG. 1 shows part of a packaging machine.
Figure 4:
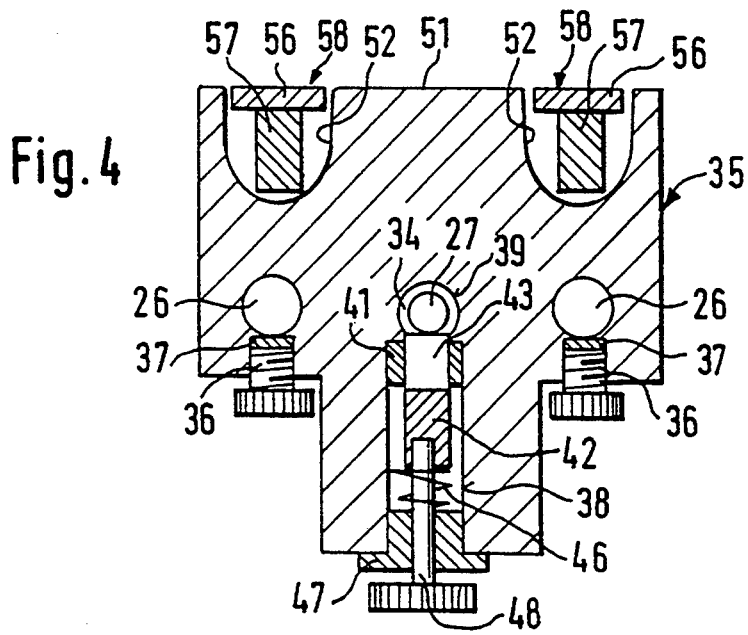
FIG. 4 shows a holding-down device for the magazine rail of FIGS. 2 and 3 in cross section in the plane IV—IV of FIG. 3.
Figure 5:
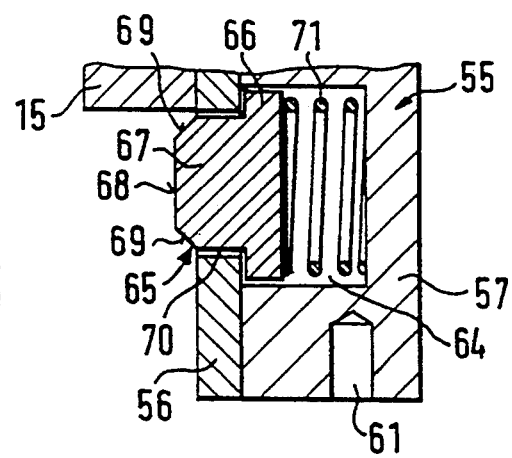
FIG. 5 shows a restraint of the magazine rail of FIG. 2 in longitudinal section in the plane V—V of FIG. 2.
Figure 6:
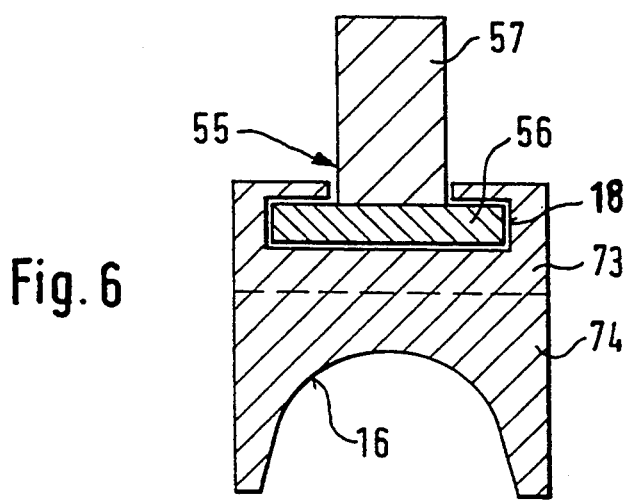
FIG. 6 shows the magazine rail of FIG. 2 in cross section in the plane VI—VI of FIG. 4.

A packaging machine for filling and sealing containers has a conveyor device 10 for conveying them to the various processing stations. This conveyor device has as its conveying means an endless belt 11, to which drivers 12 of T-shaped cross section are secured, whose sides 13 parallel to the belt 11 are embodied in platelike fashion. The height of the drivers 12 is equivalent to the width of the belt 11, and the spacing between the various drivers 12 on the belt 11 is always uniform.

Container receptacles 15 can be coupled to the drivers 12 and have a T-shaped groove 18 adapted to the cross section of the drivers 12; the drivers 12 can engage these grooves 18 form-fittingly crosswise to the conveying direction of the belt 11. The container receptacles 15 are supported on a carrier rail 14 that extends beneath the belt 11 and drivers 12. On the side remote from the belt 11, the container receptacles 15 have recesses 16, each for receiving one container. The shape of the recess 16 is adapted to the format of the particular containers being conveyed.

Upon a format change, to enable exchanging the container receptacles 15 of one format for a set having a different format, a changing device 20 is disposed at a station under the conveying device 10, on the frame 17 of the packaging machine that also carries this conveying device 10. The changing device 20 has a raisable and lowerable bar 21 to which four tappets 23 are secured via a transverse arm 22. The bar 21, whose driving and control devices, not shown, are disposed in the frame 17, is located below the conveying path of the container receptacles 15, so that two tappets 23 at a time, upon a stroke of the bar 21, pushes a container receptacle 15 that has been brought there upward, away from its drivers 12, crosswise to the conveying direction of the drivers.

At the station having the changing device 20, a magazine carrier 25 is also disposed on the frame 17 and extends laterally of the changing device 20. The magazine carrier 25 has two stationary guide rods 26 and one movable tie rod 27, which extend in a vertical plane transversely to the conveying device 10 behind the belt 11. Transverse struts 28, 29 join the guide rods 26 to one another and serve to guide the tie rod 27.

Annular grooves 31 are formed on the tie rod 27, spaced apart from one another by a distance equivalent to the height of the container receptacles 15. The annular grooves 31 have an upper side 32, extending transversely to the axis of the tie rod 27, and a lower, conically inclined side 34.

A platelike holding-down device 35 is also disposed on the magazine holder 25 and is displaceable along the guide rods 26 and the tie rod 27 that penetrate it. Clamping screws 36 are disposed in the holding-down device 35 in the side remote from the conveying device 10; via brake disks 37, these screws press against the guide rods 26. Between the two clamping screws 36, there is a bore 38 in the holding-down device 35, and this bore opens into a guide bore 39 for the tie rod 27. A guide bush 41, in which a detent pin 42 is guided, is press-fitted into the bore 38 in the end toward the tie rod 27. The detent pin has a flattened shoulder 43 on its tip, and the opposite side of the tip has a bevel 44, so that the wedge-shaped end of the detent bolt 44 corresponds approximately to the cross section of the annular grooves 31 of the tie rod 27 and can engage them. The detent pin 42 is urged in the direction of the tie rod 27 by a spring 46, which is located in the interior of the bore 38 and is supported against an insert part 47 that closes off the bore 38. The insert part 47 is penetrated by a tie bolt 48 that is firmly joined to the detent pin 42. With a fixation screw 49 screwed in on the upper side of the holding-down device 25 in the region of the detent bolt 42, the detent bolt 42 can be fixed in the disengaged position. In the side 51 toward the conveying device 10, the holding-down device 35 has two recesses 52, which extend halfway around the magazine rails 55 for the container receptacles 15.

In vertical alignment each with two drivers 12 of the conveying device 10 that are located in the changing device 20, two magazine rails 55 can be disposed on the magazine carrier 25 in order to store a plurality of container receptacles 15. Each of the two magazine rails 55 comprise two joined-together rails 56, 57 of T-shaped cross section. The narrow rail 56 has the same cross-sectional area as the platelike part of a driver 12, so that the 10 container receptacles 15 can be slipped onto the narrow rails 56. The narrow rail 56 is disposed on the magazine carrier 25 in such a way that its front side 58 is aligned with both the front side of the drivers 12 and the side 51 of the holding-down device 35. A bore 61 is embodied on the other, thick rail 57, on its lower end 59, and this bore is engaged by a retaining pin, not shown, which is mounted on the top of the stationary guide part of the conveyor device 10. Located on the upper end of the magazine carrier 25 is a head 62 with clamping screws 63 for firmly clamping the two magazine rails 55. A magazine rail 55 can be easily changed on the magazine carrier 25 by loosening the associated clamping screw 63, pulling the magazine rail 55 out of the retaining pin, and then replacing it with a different magazine rail 55.

The region of the lower end 59 of each magazine rail 55 includes a restraint 60. This element 60 has a thrust piece 65, in a recess 64 in the thick rail 55 and in an aperture 70 of the narrow rail 56. The thrust piece has a collar 66 and a block-shaped portion 67, whose side 68 remote from the collar 66 has two bevels 69. The block-shaped portion 67 protrudes through the aperture 70 in the narrow rail 56, at whose front side 58 the bevels 69 of the thrust piece 65 begin. A spring 71 in the recess 64 presses the thrust piece 65 by its collar 66 against the side toward the recess 64 of the narrow rail 56. The spring force of the spring 71 is designed such that even with a thrust piece 65 pressed in by a container receptacle 15, the container receptacle 15 does not slide onward on the narrow rail 56 by its own weight, even if the magazine 55 is completely filled with a plurality of container receptacles 15 and its weight also acts on the container receptacle 15 located in the region of the thrust piece 65.

A pin 72 disposed in the upper end region of the narrow rail 56 serves as a stop to prevent container receptacles 15 from sliding out the end opposite the thrust piece 65.

The container receptacles 15 are shaped like graduated blocks, with a raised narrow portion 73 and a lower wide portion 74. The recesses 16 for containers are embodied in the wide portion 74. The T-shaped groove 18, with which the container receptacle 15 can be threaded onto a magazine rail 55, is embodied in the narrow portion 73.

For loading container receptacles 15 in magazines and removing them from magazines, the belt 11 of the conveyor device 10 is positioned incrementally in such a way that two drivers 12 at a time are located precisely below the two magazine rails 55 inserted in the magazine carrier 25 and are aligned with these rails.

When the container receptacles 15 carried by the conveyor device 10 are loaded into the two magazine rails 55 (FIG. 1), the holding-down device 35 is fixed in the upper region of the magazine carrier 25. This is achieved by tightening the fixation screw 49, with the tie bolt 48 already tightened, and exerting a force via the clamping screws 36 upon the guide rods 26 that is greater than the force of gravity of the holding-down device 35.

Once the belt 11 has stopped, the tappets 23 are moved upward with the bar 21, in the course of which they push the two container receptacles 15 available there into the magazine rails 55. The stroke of the tappets 23 is long enough that the container receptacles 15 are pushed all the way across the thrust piece 65. Next, the tappets 23 return to their original lower position, which is picked up by a sensor 77. The belt 11 is then moved onward by the distance between two drivers 12, in order to load the next container receptacles 15 of one format set into a magazine.

Once all the container receptacles 15 have been taken from the belt 11, the thus-filled magazine rails 55 are raised out of the magazine carrier 25, and other magazine rails 55, equipped with container receptacles 15 of the desired format, are inserted into the magazine carrier 25, so that the holding-down device 35 rests on the uppermost container receptacles 15 at that time.

When these container receptacles 15 are removed, or unloaded, from the magazine rails 55 to the belt 11 (FIG. 3), the fixation screw 49 of the holding-down device 35 is first loosened. In the downward motion of the bar 21 of the changing device 20, with which the tie rod 27 is firmly joined, the holding-down device 35 is carried along as well, since the detent pin 42 has engaged an annular groove 31 of the tie rod 27. The stroke during the downward motion of the holding-down device 35 must be at least long enough that the lowermost container receptacle 15 at the time in the magazine rail 55 is pushed across the thrust piece 65. The container receptacles 15 then slide solely by their own weight across the drivers 12 standing in readiness and then rest on the carrier rail 14. Next, the carrying belt 11 is moved onward to the next free drivers 12. In the ensuing upward motion of the bar 21 and tie rod 27, the holding-down device 35 continues to be braked by the brake disks 37 cooperating with the guide rods 26, whereupon the detent pin 42 slides with its bevel 44 over the conical side 44 of the annular groove 31 and the adjoining part of the tie rod 27, in which groove the detent pin 42 locks into place once again. The next downward motion of the tie rod 27 then ensues, and with it the unloading of the next two container receptacles 15.

The clamping screws 36 on the holding-down device 35 should be adjusted such that the spring force of the spring 46 on the detent pin 42 cannot cause the holding-down device 37 to be moved upward jointly with the tie rod 27 in the upward motion of the tie rod 27.

In the exemplary embodiment described above, the magazine carrier 25 has two places for magazine rails 55. Naturally, it is also possible for only one place, or more than two places, to be provided. It should be noted that the conversion time for the packaging machine upon a format change can be reduced still further if the magazine carrier 25 is expanded with further places for magazine rails 55, and if the changing device 20 is equipped with correspondingly more tappets 23. It is also possible to dispose two changing devices 20, for instance, side by side on the conveyor device 10, with the first of these serving to load container receptacles 15 and the other to unload them, so that a fully automatic format change can be achieved.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A packaging machine which includes a filling and sealing machine having a conveyor device (10) with drivers (12) on which container receptacles (15) are interchangeably disposed, a magazine (55) that stores a plurality of container receptacles (15), the magazine (55) can be connected to a stationary magazine carrier (25) that is disposed on a frame (17) of the packaging machine in a region of a station of the conveyor device (10) and receives the magazine (55) transversely to the conveying direction of the conveyor device (10), and that an intermittently operating changing device (20) is associated with the magazine carrier (25), which device transfers one container receptacle (15) at a time from the magazine (55) to a driver (12) or vice versa.

2. A packaging machine as defined by claim 1, in which the container receptacles (15) can be coupled form-fittingly to the drivers (12) of the conveyor device (10) in a raisable and lowerable manner, and that the magazine (55) is embodied as a guide rail (56, 57) for displaceable form-fitting lining up of a plurality of container receptacles (15) in rows.

3. A packaging machine as defined by claim 2, in which the guide rail (56, 57) has a T-shaped cross section, and the container receptacles (15) have a groove (76) of approximately congruent T-shaped cross section.

4. A packaging machine as defined by claim 2, in which a restraint (60) with a thrust piece (65) is disposed on the magazine (55).

5. A packaging machine as defined by claim 3, in which a restraint (60) with a thrust piece (65) is disposed on the magazine (55).

6. A packaging machine as defined by claim 1, in which the magazine (55) is disposed interchangeably on the magazine carrier (25) in vertical alignment above the conveying path of the drivers (12).

7. A packaging machine as defined by claim 2, in which the magazine (55) is disposed interchangeably on the magazine carrier (25) in vertical alignment above the conveying path of the drivers (12).

8. A packaging machine as defined by claim 3, in which the magazine (55) is disposed interchangeably on the magazine carrier (25) in vertical alignment above the conveying path of the drivers (12).

9. A packaging machine as defined by claim 4, in which the magazine (55) is disposed interchangeably on the magazine carrier (25) in vertical alignment above the conveying path of the drivers (12).

10. A packaging machine as defined by claim 1, in which the changing device (20) has at least one raisable and lowerable tappet (23) for pushing container receptacles (15) away from the drivers (12) of the conveyor device (10) onto a magazine (55) and has a tie rod (27) with a holding-down device (35) adjustably coupleable to said tie rod for pushing container receptacles (15) away from the magazine (55) onto the drivers (12), and that the tappet (23) and the tie rod (27) are moved up and down by a common reciprocating drive.

11. A packaging machine as defined by claim 2, in which the changing device (20) has at least one raisable and lowerable tappet (23) for pushing container receptacles (15) away from the drivers (12) of the conveyor device (10) onto a magazine (55) and has a tie rod (27) with a holding-down device (35) adjustably coupleable to said tie rod for pushing container receptacles (15) away from the magazine (55) onto the drivers (12), and that the tappet (23) and the tie rod (27) are moved up and down by a common reciprocating drive.

12. A packaging machine as defined by claim 3, in which the changing device (20) has at least one raisable and lowerable tappet (23) for pushing container receptacles (15) away from the drivers (12) of the conveyor device (10) onto a magazine (55) and has a tie rod (27) with a holding-down device (35) adjustably coupleable to said tie rod for pushing container receptacles (15) away from the magazine (55) onto the drivers (12), and that the tappet (23) and the tie rod (27) are moved up and down by a common reciprocating drive.

13. A packaging machine as defined by claim 4, in which the changing device (20) has at least one raisable and lowerable tappet (23) for pushing container receptacles (15) away from the drivers (12) of the conveyor device (10) onto a magazine (55) and has a tie rod (27) with a holding-down device (35) adjustably coupleable to said tie rod for pushing container receptacles (15) away from the magazine (55) onto the drivers (12), and that the tappet (23) and the tie rod (27) are moved up and down by a common reciprocating drive.

14. A packaging machine as defined by claim 6, in which the changing device (20) has at least one raisable and lowerable tappet (23) for pushing container receptacles (15) away from the drivers (12) of the conveyor device (10) onto a magazine (55) and has a tie rod (27) with a holding-down device (35) adjustably coupleable to said tie rod for pushing container receptacles (15) away from the magazine (55) onto the drivers (12), and that the tappet (23) and the tie rod (27) are moved up and down by a common reciprocating drive.

15. A packaging machine as defined by claim 1, in which a plurality of magazines (55) are disposed on the magazine carrier (25) side by side in the conveying direction of the conveyor device (10), such that the changing device (20) simultaneously engages a plurality of container receptacles (15).

16. A packaging machine as defined by claim 2, in which a plurality of magazines (55) are disposed on the magazine carrier (25) side by side in the conveying direction of the conveyor device (10), such that the changing device (20) simultaneously engages a plurality of container receptacles (15).

17. A packaging machine as defined by claim 3, in which a plurality of magazines (55) are disposed on the magazine carrier (25) side by side in the conveying direction of the conveyor device (10), such that the changing device (20) simultaneously engages a plurality of container receptacles (15).

18. A packaging machine as defined by claim 4, in which a plurality of magazines (55) are disposed on the magazine carrier (25) side by side in the conveying direction of the conveyor device (10), such that the changing device (20) simultaneously engages a plurality of container receptacles (15).

19. A packaging machine as defined by claim 6, in which a plurality of magazines (55) are disposed on the magazine carrier (25) side by side in the conveying direction of the conveyor device (10), such that the changing device (20) simultaneously engages a plurality of container receptacles (15).

20. A packaging machine as defined by claim 10, in which a plurality of magazines (55) are disposed on the magazine carrier (25) side by side in the conveying direction of the conveyor device (10), such that the changing device (20) simultaneously engages a plurality of container receptacles (15).

* * * * *